No. 877,657. PATENTED JAN. 28, 1908.
W. MASON.
GAS OPERATED GUN.
APPLICATION FILED NOV. 6, 1905.
9 SHEETS—SHEET 1.
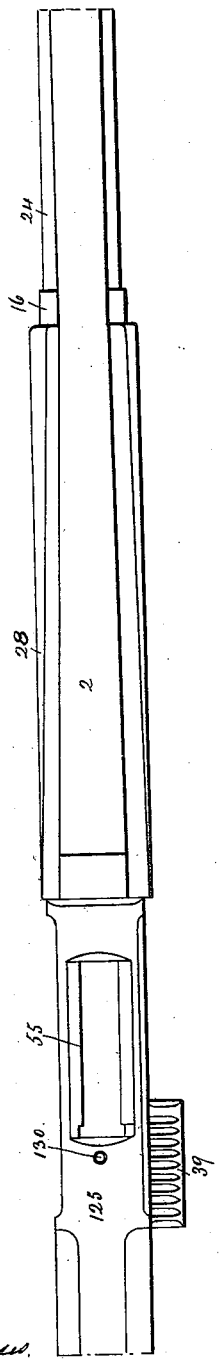
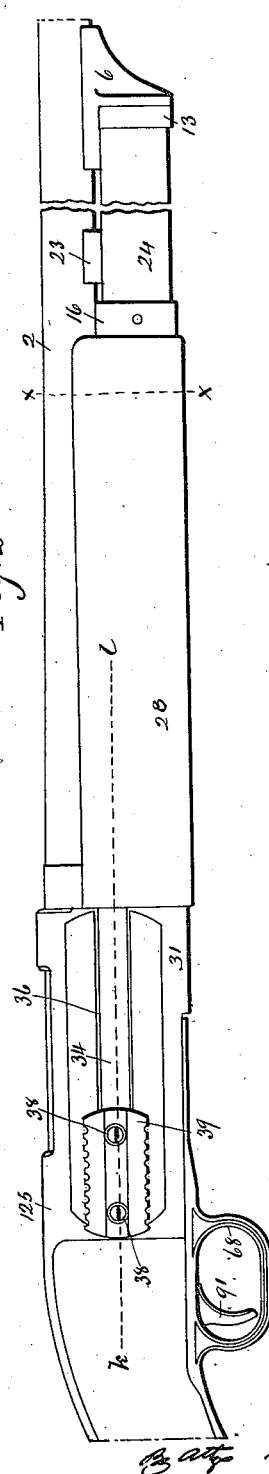
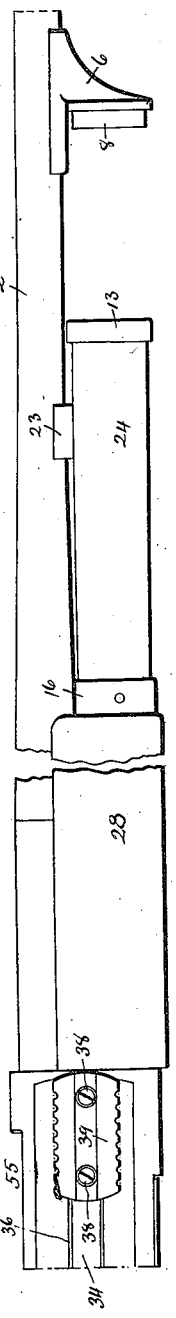

No. 877,657.
PATENTED JAN. 28, 1908.
W. MASON.
GAS OPERATED GUN.
APPLICATION FILED NOV. 6, 1905.
9 SHEETS—SHEET 2.
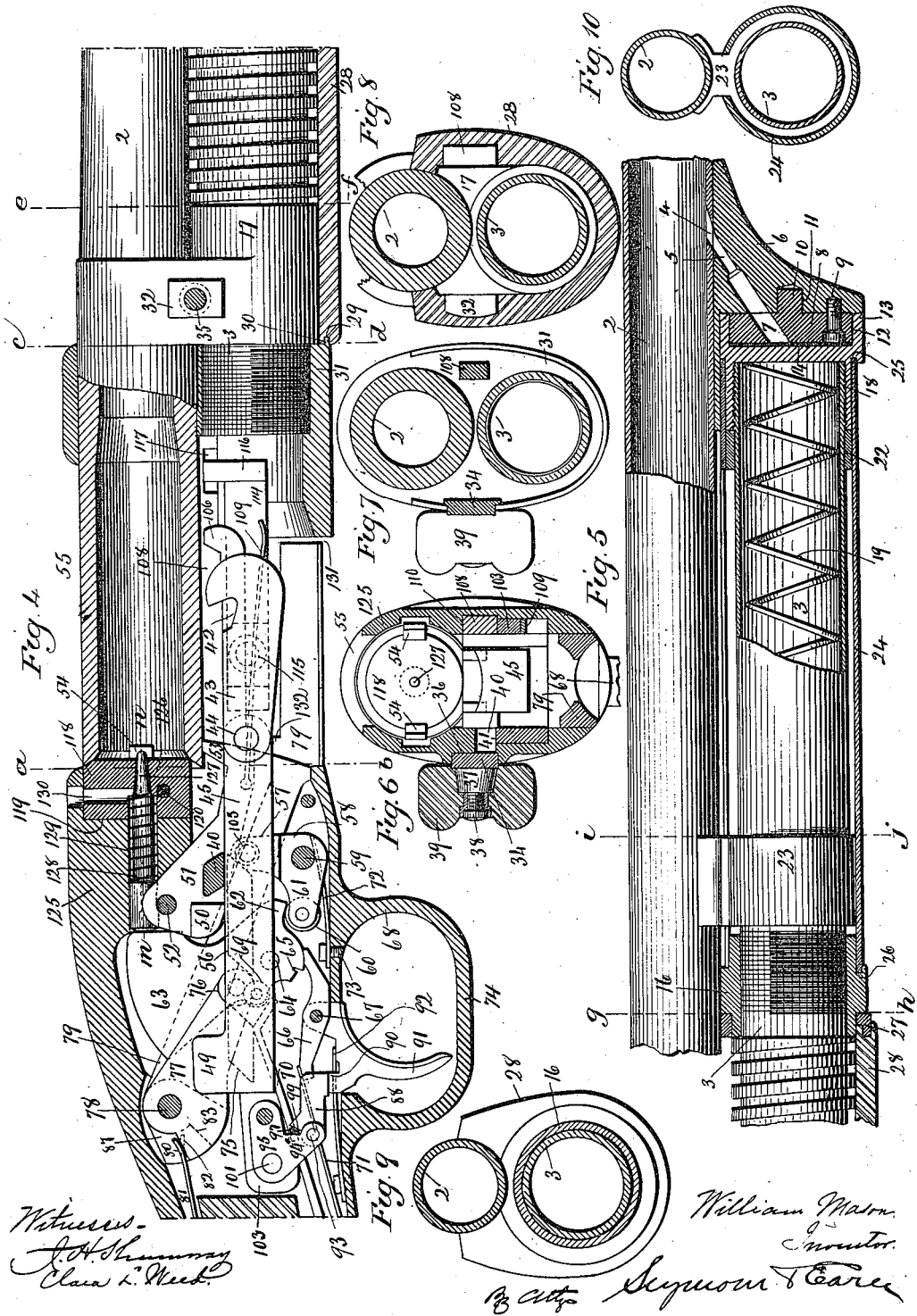

No. 877,657. PATENTED JAN. 28, 1908.
W. MASON.
GAS OPERATED GUN.
APPLICATION FILED NOV. 6, 1905.
9 SHEETS—SHEET 3.
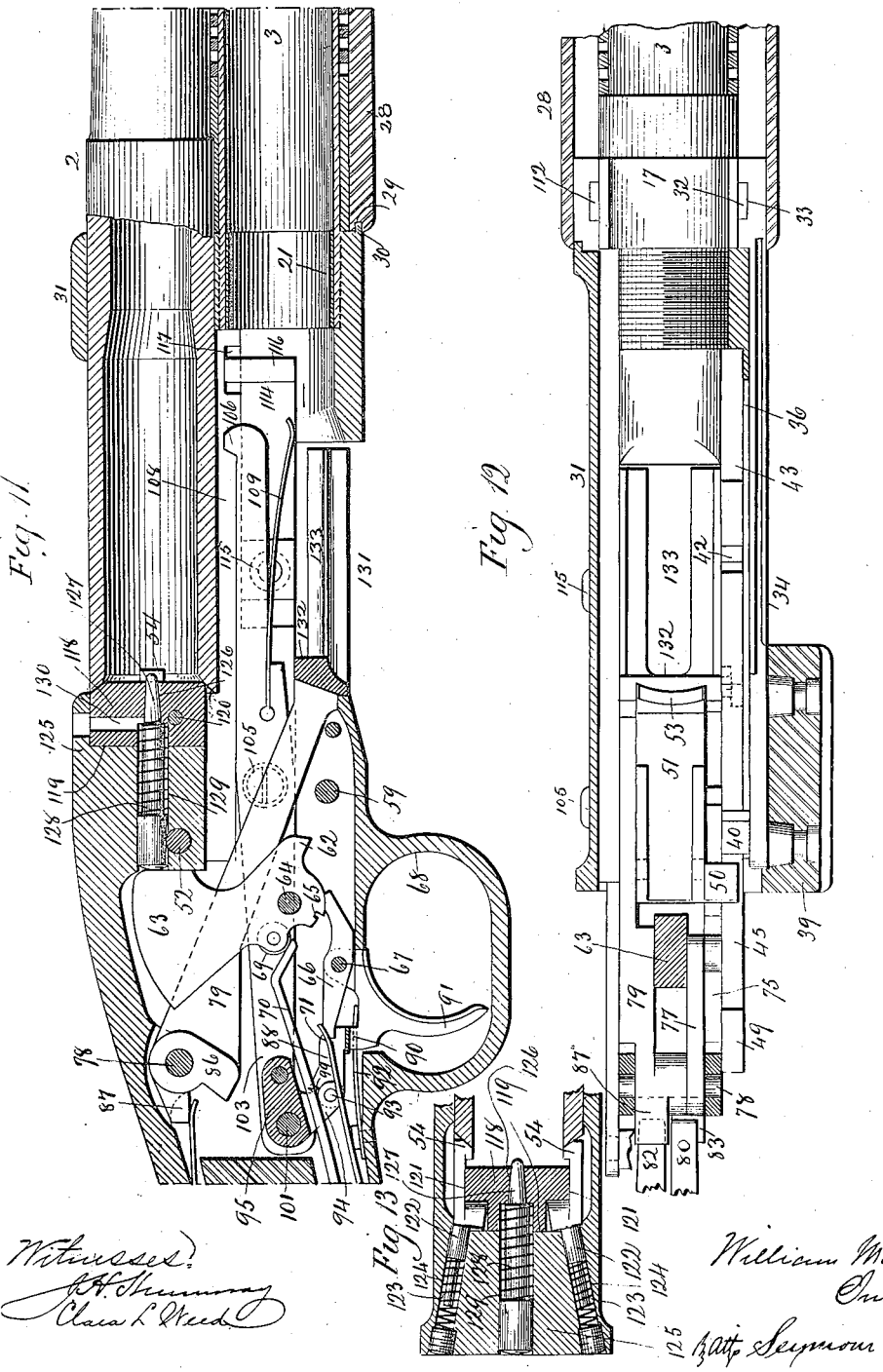

No. 877,657. PATENTED JAN. 28, 1908.
W. MASON.
GAS OPERATED GUN.
APPLICATION FILED NOV. 6, 1905.
9 SHEETS—SHEET 4.
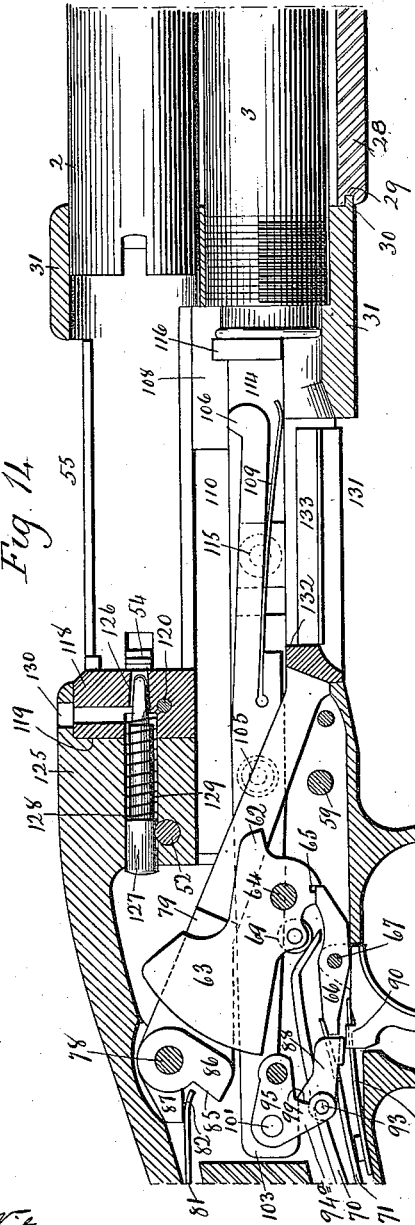
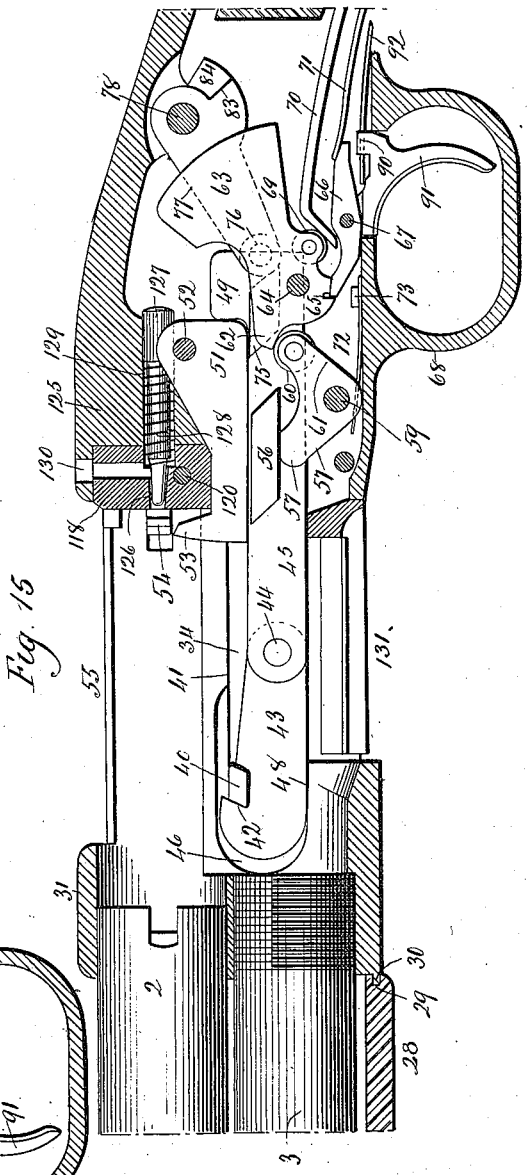

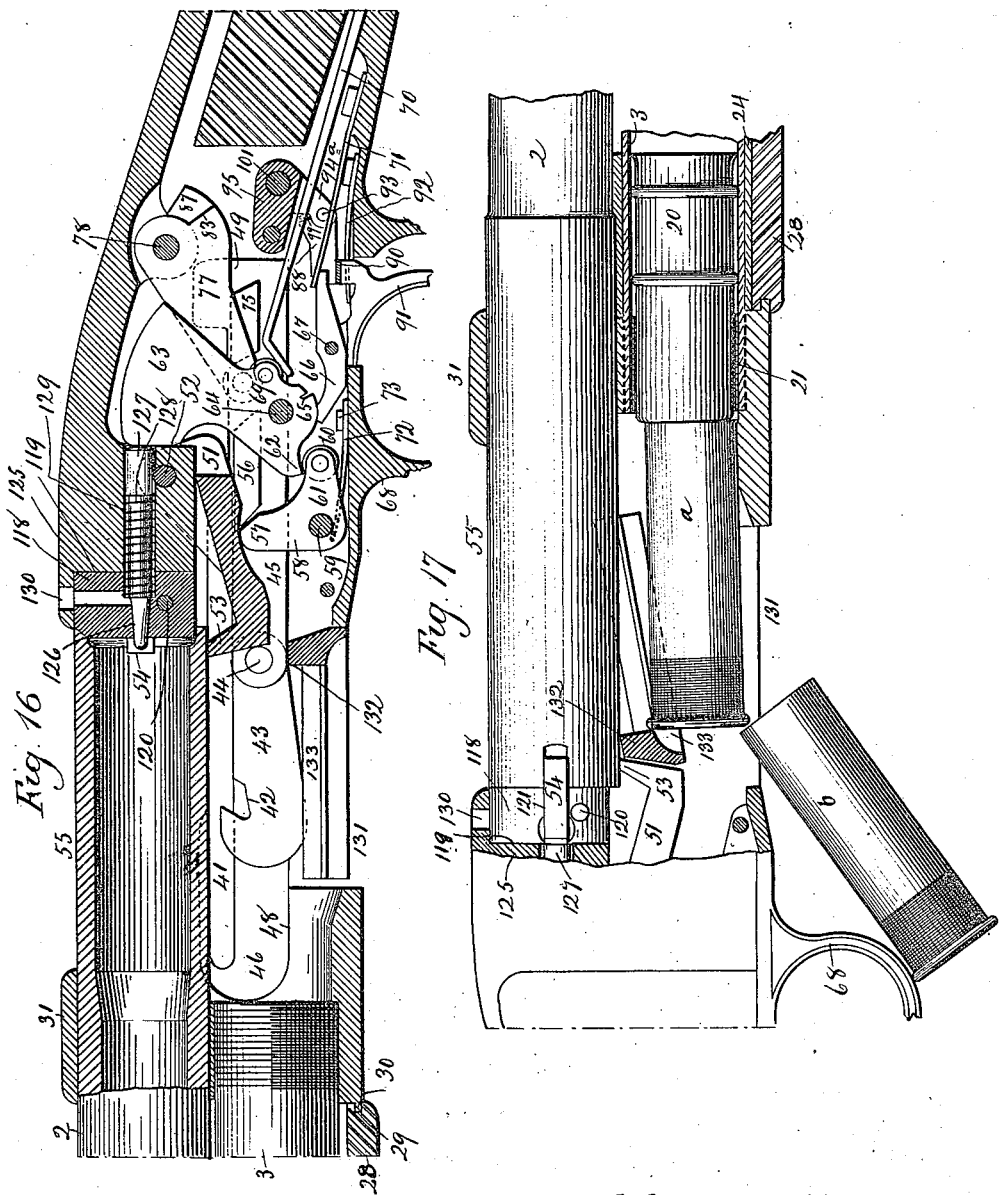

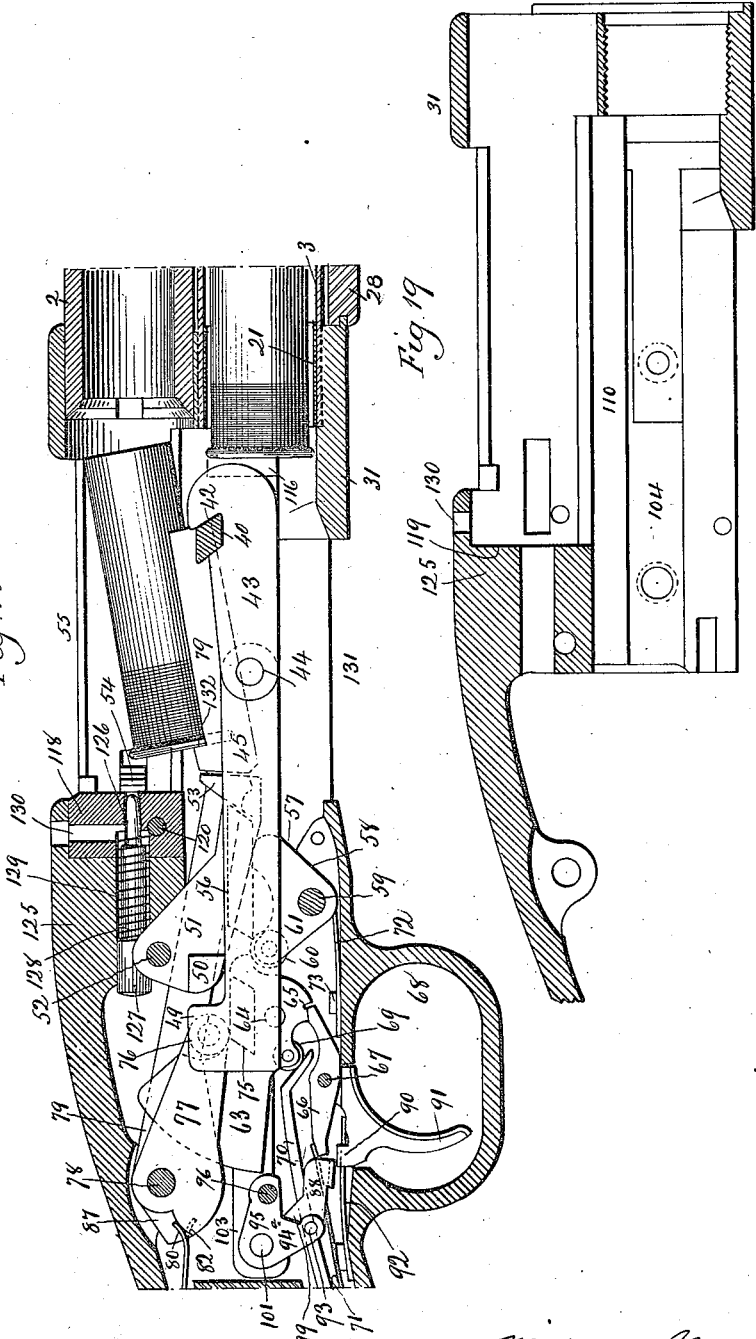

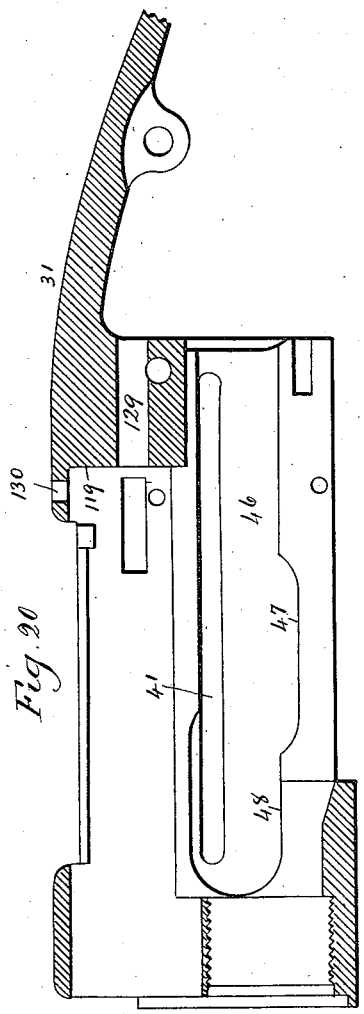
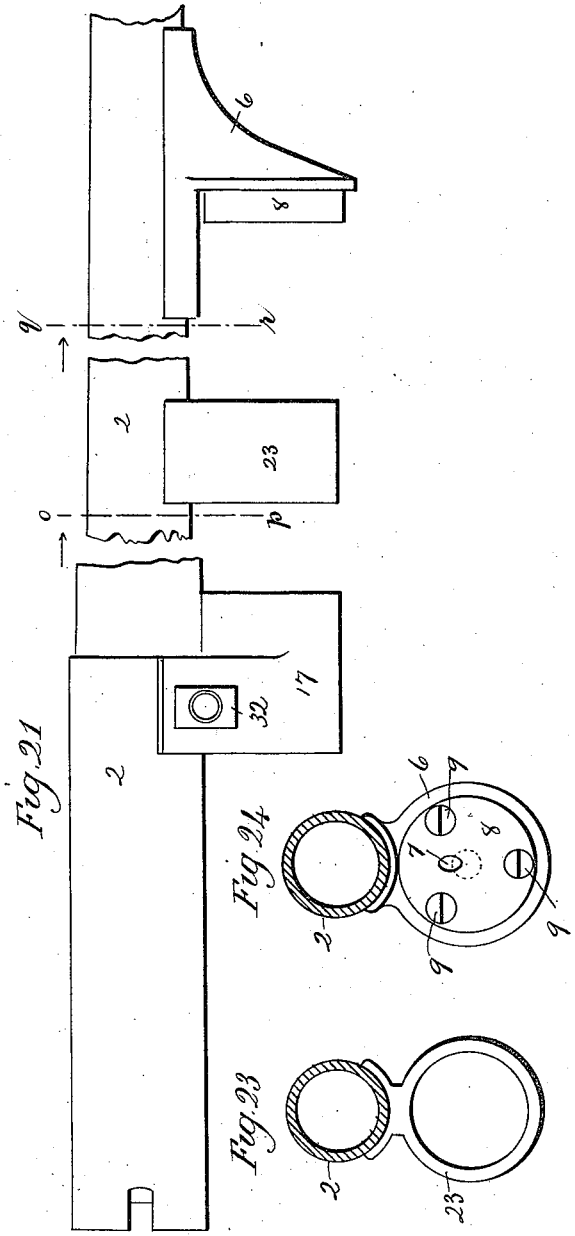
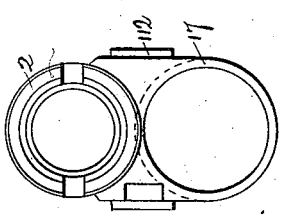

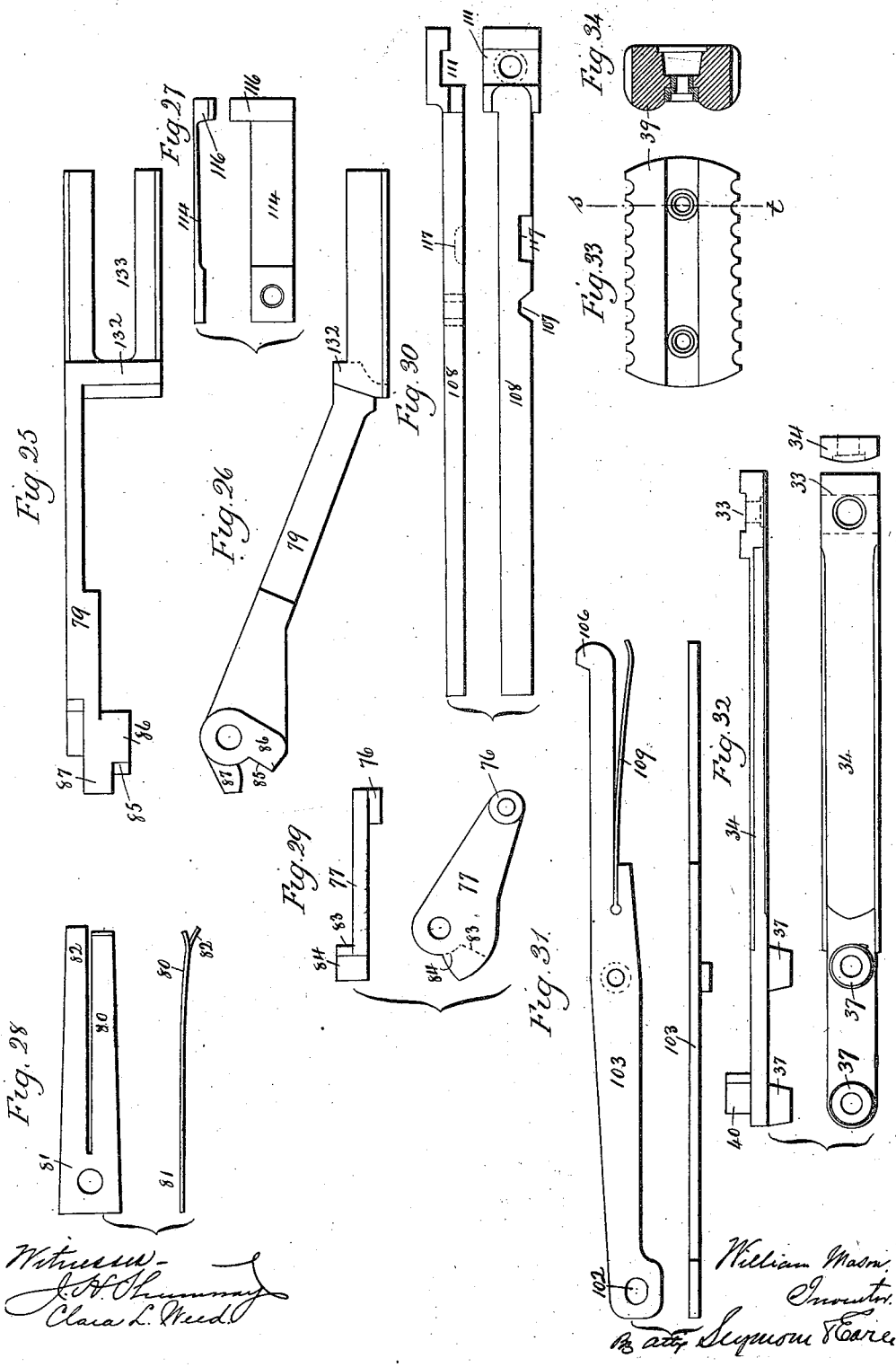

No. 877,657. PATENTED JAN. 28, 1908.
W. MASON.
GAS OPERATED GUN.
APPLICATION FILED NOV. 6, 1905.
9 SHEETS—SHEET 9.
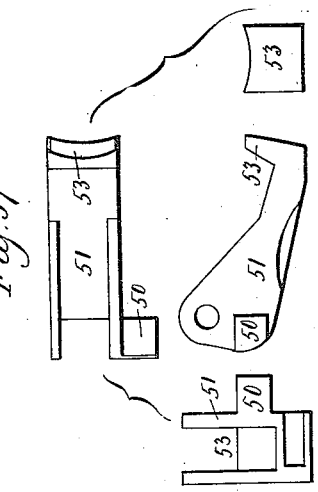
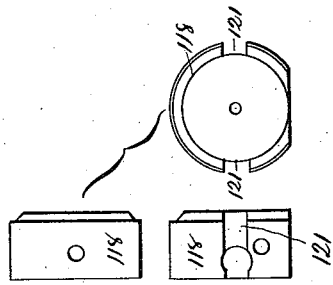
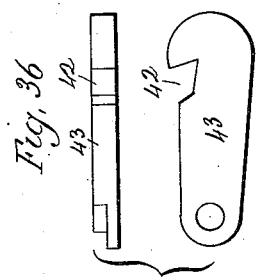
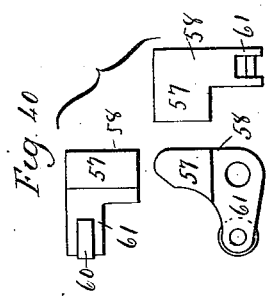
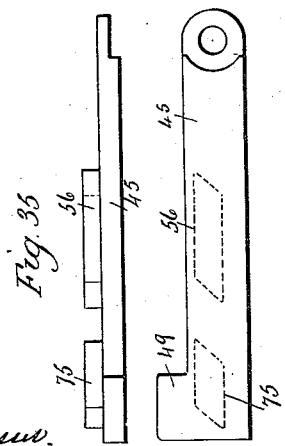
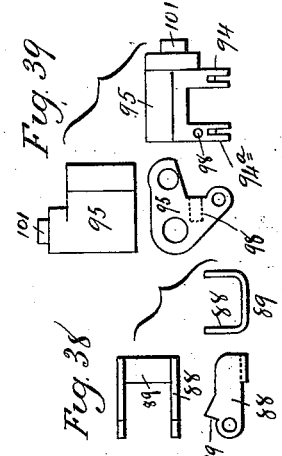

UNITED STATES PATENT OFFICE.

WILLIAM MASON, OF NEW HAVEN, CONNECTICUT, ASSIGNOR TO WINCHESTER REPEATING ARMS CO., OF NEW HAVEN, CONNECTICUT, A CORPORATION.

GAS-OPERATED GUN.

No. 877,657.      Specification of Letters Patent.      Patented Jan. 28, 1908.

Application filed November 6, 1905. Serial No. 286,108.

*To all whom it may concern:*

Be it known that I, WILLIAM MASON, a citizen of the United States, residing at New Haven, in the county of New Haven and State of Connecticut, have invented a new and useful Improvement in Gas - Operated Guns; and I do hereby declare the following, when taken in connection with the accompanying drawings and the letters of reference marked thereon, to be a full, clear, and exact description of the same, and which said drawings constitute part of this specification, and represent, in—

Figure 1 a broken plan view of a gun constructed in accordance with my invention, the barrel, the butt-stock, and the upper tang forming an integral part of the gun-frame being broken away. Fig. 2 a corresponding view in right hand side elevation, showing the gun closed. Fig. 3 a broken view in right hand side elevation showing the gun open; the rear end of the frame being broken away on the line $x$—$x$ of the preceding figure. Fig. 4 a broken view looking into the gun from its right hand side and showing it closed, this view being secured by cutting the gun-frame and tang on a vertical, central, longitudinal line and leaving all of the parts of the mechanism in place and exposed. Fig. 5 a view partly in right hand side elevation and partly in vertical longitudinal section showing the forward end of the tubular magazine and a portion of the gun-barrel, this view being virtually a continuation of the preceding. Fig. 6 a view of the gun in vertical cross-section on the line $a$—$b$ of Fig. 4. Fig. 7 a corresponding view on line $c$—$d$ of Fig. 4. Fig. 8 a corresponding view on line $e$—$f$ of Fig. 4. Fig. 9 a corresponding view on line $g$—$h$ of Fig. 5. Fig. 10 a corresponding view on line $i$—$j$ of Fig. 5. Fig. 11 a broken view in vertical longitudinal section looking toward the left hand side of the gun which is shown closed, some of the parts of the mechanism being omitted for clearness. Fig. 12 a broken view of the gun in horizontal section on the line $k$—$l$ of Fig. 2. Fig. 13 a broken view in horizontal section on the line $m$—$n$ of Fig. 4, showing the obturator, the extractors, &c. Fig. 14 a broken view partly in vertical central longitudinal section, and partly in right hand elevation, showing the parts contained within the left hand half of the gun-frame in the positions they have when the gun is open, though some have been removed for clearness. Fig. 15 a similar view showing the left hand half of the gun-frame broken away, this view being designed with particular reference to showing parts not shown in Fig. 14, though showing some parts also shown therein. Fig. 16 a view corresponding substantially to Fig. 15, but showing the gun closed. Fig. 17 a broken view in right hand elevation with some parts in section, showing the method of charging the tubular magazine. Fig. 18 a broken view of the gun partly in vertical longitudinal section and partly in right hand side elevation showing a cartridge lifted by the carrier into position for being picked up by the barrel shown as having already begun its rearward movement over the cartridge. Fig. 19 a detached view in vertical longitudinal section of the gun-frame, showing the left hand side thereof. Fig. 20 a corresponding view showing the right hand side of the gun frame. Fig. 21 a detached broken view in right hand side elevation of the gun-barrel intermediate portions of which are broken away for economy of space. Fig. 22 a view thereof in rear elevation, showing its coupling sleeve. Fig. 23 a cross-sectional view of the barrel on the line $o$—$p$ of Fig. 21, looking forward. Fig. 24 a view of the barrel in cross-section on the line $q$—$r$ of Fig. 21, looking forward. Fig. 25 a detached plan view of the pivotal carrier. Fig. 26 a view thereof in side elevation. Fig. 27 comprises a plan and a side view of the cartridge-stop. Fig. 28 comprises a plan view and an edge view of the double-leaf spring. Fig. 29 comprises a plan and a side view of the carrier-lever. Fig. 30 comprises a plan and a side view of the left hand action slide. Fig. 31 comprises a view in side elevation, and a plan view of the timing-lever. Fig. 32 comprises a plan, outside and front elevation views of the action-slide connection. Fig. 33 a detached view of the action handle in elevation. Fig. 34 a view thereof in vertical cross-section on the line $s$—$t$ of Fig. 33. Fig. 35 comprises a plan view and a view in outside elevation of the right hand action slide. Fig. 36 comprises a plan view and a view in outside elevation of the action hook. Fig. 37 comprises a plan view, and views in side, rear and front elevation of the ejector. Fig. 38 comprises a plan view, a side view and a front view of the pivotal timing-yoke. Fig. 39 comprises a plan view, a side view and a front view of the timing-rocker. Fig. 40 comprises a plan view, a right hand side view and a front view of the cocking-lever. Fig. 41 comprises a plan view, a side view, and a rear view of the obturator.

My invention relates to an improvement in that class of gas-operated movable barrel, tubular magazine shot guns in which a portion of the gases of explosion supply the power for all of the operations required in working the gun barring only the loading and firing, the object being to produce an effective, safe and reliable gun of this character.

With these ends in view, my invention consists in a gun having certain details of construction and combination of parts as will be hereinafter described and pointed out in the claims.

In carrying out my invention as herein shown, the movable barrel 2 is formed at a point in front of the stationary tubular magazine 3 with a rearwardly and downwardly inclined gas-port 4 (Fig. 5) registering with a rearwardly inclined gas-passage 5 formed in a bracket 6 rigidly attached to the lower face of the barrel, (Fig. 24). The said gas-passage 5 registers at its rear end with a gas-passage 7 formed in a short piston 8 attached by three screws 9 (Fig. 24) to the rear face of the bracket 6 and having a dowel 10 entering a dowel-hole 11 formed therein.

If desired, the piston may be made integral with the bracket, though the construction described is more convenient. The said piston fits closely into a forwardly opening gas-chamber 12 formed in the forward end of a magazine-tip 13 applied to the forward end of the magazine, the piston being enough shorter than the depth of the chamber to produce a narrow space 14 (Fig. 5) between the face of the piston and the bottom of the chamber 12 of which the space in reality forms a part. A portion of the gases of explosion pass through the gas-port 4 and the gas-passages 5 and 7 into the space 14, and expanding there, impinge against the face of the piston 8 and the bottom of the chamber 12 and produce the pressure required for moving the barrel 2 sufficiently forward to open the breech and extract the spent-shell, the pressure of the gas acting in effect against the front end of the magazine. As the barrel moves forward, it compresses an operating spring encircling the magazine 3 and abutting at its forward end against the rear edge of an operating spring-abutment-sleeve 16 (Fig. 5) and at its rear end against the forward edge (Fig. 4) of a coupling sleeve 17 mounted upon the barrel 2 at the rear end thereof. The magazine-tip 13 is formed with a rearwardly opening threaded socket 18 into which the threaded forward end of the magazine is screwed. The bottom wall of this socket forms an abutment for the forward end of a short magazine-follower spring 19 (Fig. 5) the rear end of which is entered into a magazine-follower 20 of usual construction and prevented from being pushed out of the rear end of the magazine by a bushing 21, (Fig. 17).

A buffer ring 22 (Fig. 5) formed of vulcanized fiber or equivalent material, mounted upon the magazine in position to bear against the rear edge of the tip 13, has its rear edge impinged upon by the forward edge of a bearing-sleeve 23 (Figs. 5 & 10) rigidly secured to and depending from the barrel and encircling the magazine and supporting and guiding the forward end of the barrel as the same moves forward and back. When the barrel is moved forward by the pressure developed by the admission of gas into the space 14 aforesaid, the forward edge of the sleeve 23 impinges against the rear edge of the buffer 22 and so reduces the shock of stopping the barrel.

A tubular sheet-metal jacket or guard 24 having its forward edge set into an annular groove 25 in the tip 13 (Fig. 5) and its rear edge set into an annular groove 26 in the abutment sleeve 16, incloses the forward end of the magazine and the bearing-sleeve 23 and prevents the same from injuring the hand as it moves back and forth over the forward end of the magazine.

The abutment-sleeve 16 is recessed at its rear end to receive a forearm tip 27 mounted in the forward end of the forearm 28, whereby the forward end of the forearm is strengthened and protected, its rear end being formed with an annular groove 29 receiving a tongue 30 at the forward end of the gun-frame or receiver 31, whereby the rear end of the forearm is supported.

The movement of the barrel 2 forward and back is transmitted to the parts forming the system or action of the gun by means of the coupling sleeve 17 mounted upon the barrel as already described, and therefore moving back and forth therewith. This sleeve is provided on its right hand side with a lug 32 entering a vertical groove 33 in the inner face of the forward end of a bar-like action-slide connection 34 (Fig. 32) which is rigidly secured to the sleeve 17 by means of a screw 35 (Fig. 4). This action-slide connection is located in a longitudinal groove 36 formed in the outer face of the right hand wall of the gun-frame 31. Two bored and threaded hubs 37 projecting outwardly from the rear end of the action-slide connection 34 are provided for the reception of screws 38, 38, by means of which a handle 39 is secured to the slide for the manual operation of the gun. At its rear end the action-slide is formed with an inwardly projecting finger 40 passing through and moving back and forth in a long narrow slot 41 (Fig. 20) formed in the right hand side wall of the gun frame.

During the last portion of the forward excursion of the action-slide connection 34, its finger 40 enters a notch 42 formed in the upper edge of the forward end of an action-hook 43 (Fig. 36) hung on a pivot 44 in the forward end of the right-hand action-slide 45 (Fig. 35) which moves back and forth in a recess 46 formed for its reception in the inner face of the right hand wall of the gun-frame (Fig. 20). The lower wall of the recess 46 is cut away at 47 for the reception of the action-hook 43 which rides on the forward portion 48 (Fig. 20) of the lower wall of the recess 46 during its engagement with the said finger 40. From the moment the finger 40 has been fully entered into the notch 42, the hook 43, and hence the action-slide 45, are carried forward by the action-slide connection 34.
As the action-slide 45 moves forward, a lug 49 projecting upward at its rear end engages with the rounded lower edge of a lug 50 at the rear end of the right hand side of an ejector 51 (Fig. 37) hung on a horizontal pin 52 in the gun-frame 31, whereby the upturned toe 53 at the forward end of the ejector is swung upward and caused to strike a quick blow upon the spent shell left in the grasp of the extractors 54 by the forward movement of the barrel 2. The spent shell is thus ejected through the long ejection-opening 55 in the top of the gun-frame 31 by the said ejector the upward movement of which is arrested by the obturator 118 which in this way functions as a stop for the ejector.

During the described forward movement of the action-slide 45, the beveled forward end of a lug 56 upon its left hand face rides over the forward arm 57 of a cocking-lever 58 which is turned upon its pin 59, whereby an antifriction roller 60 in the rear arm 61 of the said lever is engaged with the cam-like heel 62 of the hammer 63 with the effect of swinging the hammer backward on its pin 64 into its cocked position in which its cocking-notch 65 is entered by the forward end of a sear 66 hung upon a pin 67 mounted in the lower-tang 68. The said hammer 63 carries an antifriction roller 69 engaged by a hammer-spring 70 beneath which is located a sear spring 71 engaging with the rear end of the sear 66. The cocking-lever 58 is returned to its normal position upon the rearward excursion of the action-slide 45, by means of a cocking-lever spring 72 secured by a screw 73 to the lower tang 68 at a point just above the trigger-guard 74.

At its rear end the action-slide 45 is provided upon its inner or left hand face with a lug 75 located in line with the lug 56 and having its forward end beveled to adapt it on the forward excursion of the slide to engage with an antifriction roller 76 mounted in the forward end of a carrier-lever 77 (Fig.
29) hung in the gun frame on a pin 78, whereby the said lever is depressed, without effect however upon the pivotal cartridge-carrier 79 (Figs. 25, 26) also hung upon the pin 78 aforesaid. Upon the completion of the forward excursion of the slide 45, the lug 75 permits the carrier-lever 77 to be swung upward by the downward action upon it of the leaf 80 of a double-leaf spring 81, the leaf 82 of which acts upward on the carrier 79. The downward action of the spring 80 upon the carrier lever 77, lifts the same into the position in which it is shown in Fig. 15, the antifriction roller 76 being located directly back of the beveled rear end of the lug 75 on the action slide 45. Now at the beginning of the rearward excursion of the slide 45, the bevel at the rear end of the lug 75 engages with the roller 76 and forces the same upward, whereby the carrier-lever 77 is elevated. This causes the lower face 83 of the lug 84 on its left hand side to engage with the face 85 of a lug 86 on the right hand face of the carrier 79, whereby the same is swung upward in unison with the upward movement of the carrier-lever 77 lifting a loaded shell from the magazine into position to be telescoped, as it were, by the barrel 2 upon the rearward excursion thereof, for it must be understood that the loaded cartridges are introduced into the gun-barrel by the movement of the gun-barrel rearward over them rather than by their forward movement into the gun-barrel in the more common way. The pivotal carrier 79 is formed at its rear end with a lug 87 the lower face of which is engaged by the leaf 82 of the spring 81.

The carrier is held in its elevated or cartridge-discharging position by means of the lug 75 until the rearward movement thereof with the action-slide 45 permits the roller 76 of the carrier-lever 77 to drop over the forward end of the said lug after which the carrier and carrier-lever move downward into their normal positions, (Fig. 4), the carrier being normally held down in its normal depressed or cartridge-receiving position by the leaf 82 of the spring 81 acting upward on its lug 87 while the carrier-lever is held in its normal position by the leaf 80 of the spring 81 acting downward on its lug 84.

On the rearward excursion of the action-slide connection 34, the finger 40 thereof pushes the action-hook 43 rearward until the same is permitted by the recess 47 (Fig. 20) to drop out of engagement with the said finger, whereby the action-slide 45 is dropped, as it were, by the action-slide connection which continues to move rearward with the barrel.

To prevent the premature firing of the gun, as well as to control its automatic action and prevent all of the cartridges in the magazine being fired in succession by one pulling of the trigger, I employ a timing mechanism which puts the sear 66 "out of play", so to speak, except when the gun is fully closed, and when the trigger has been released and allowed to move forward as in an ordinary single fire gun. This timing mechanism comprises a pivotal timing-yoke 88 (Fig. 38) the crossbar 89 of which is located in a horizontal plane and adapted to be entered between the rear end of the sear 66 and a coupling lug 90 on the trigger 91 which is furnished with a trigger-spring 92. The said timing-yoke 88 is hung by a pivot 93 in the arms 94, 94ª, of a timing-rocker 95 pivoted in the lower tang 68. A small coiled spring 97 located in a socket 98 in the arm 94ª engages with a shoulder 99 on the timing-yoke and exerts a constant effort to maintain the crossbar 89 thereof in engagement with the coupling lug 90 of the trigger 91 which swings on a pivot 67 also forming a pivot for the sear 66. The sear and trigger are constructed and arranged so that the trigger never comes in contact with the rear end of the sear which it cannot operate except through the medium of the crossbar 89 of the timing-yoke 88. When the said crossbar is interposed between the rear end of the sear and the coupling lug 90 of the trigger then the trigger will operate the sear; but when the timing-yoke is retracted so as to withdraw its cross bar 89 from engagement with the rear end of the sear, then the trigger, although it may be swung on the pivot 67, is without operative effect on the sear. For the operation of the timing-rocker 95 it carries a pin 101 entering a hole 102 in the rear end of a timing-lever 103 (Fig. 31) located in a long groove 104 (Fig. 19) in the inner face of the left hand wall of the gun-frame 31 and pivoted so as to swing in a vertical plane upon a screw pivot 105. The front end of this lever has an upturned nose or projection 106 entering a notch 107 in a left hand action slide 108 (Fig. 30) when the same is at the limit of its rearward excursion at which time the entrance of the nose 106 into the notch 107 permits the lever 103 to be turned on its pivot 105 by its spring 109, whereby the timing-rocker 95 is swung on its pivot 96 with the effect of moving the timing-yoke 88 forward sufficiently to introduce its crossbar 89 between the coupling lug 90 of the trigger 91 and the rear end of the sear 66. However, the instant the left hand action slide 108 begins its forward excursion, the beveled rearward wall of the notch 107 forces the nose 106 of the lever 103 downward, whereby the rear end of the lever is lifted with the effect of operating the rocker 95 and yoke 88 in the withdrawal of the bar 89 from operative relations with respect to the rear end of the sear and to the lug 90 of the trigger, and from this moment the riding of the nose 106 upon the straight under edge of the slide 108 will hold the rocker and yoke in these positions and prevent the latter from returning to its operative relations to the sear and trigger.

The left hand action-slide 108 is located and moves back and forth in a long groove 110 in the inner face of the left hand wall of the gun frame 31 (Fig. 19) and is formed upon the inner face of its forward end with a vertical slot 111 receiving a vertical lug 112 projecting from the left hand side of the coupling-sleeve 17 to which the forward end of the slide is rigidly secured by means of a screw, (not shown), whereby the left hand action-slide is caused to move back and forth in unison with the gun-barrel. The timing mechanism above described makes it necessary to allow the trigger to move forward each time after firing before the gun can be fired again, thus necessitating an interval between the successive shots and preventing the trigger being effectively pulled so as to release the hammer except when the gun is fully closed. But for this mechanism the gun could be fired automatically until stripped of all its cartridges by simply holding the trigger back.

To control the feeding of the cartridges out of the magazine 3, I employ a cartridge-stop 114 (Fig. 27), the body of which has the form of a flat spring and which is located back of the forward end of the timing-lever 103 in the groove 104 and secured in place by a screw 115 passing through its rear end. This stop is provided at its forward end with an inwardly projecting stop-finger 116 also extending upward for entrance into a notch 117 in the lower edge of the left hand action slide 108 at a point in front of the timing-notch 107 thereof. When the gun is fully closed, the notch 117 is brought into registration with the upper end of the finger 116 and permits the stop 114 to spring outward from right to left, whereby its finger 116 is cleared from the rear end of the magazine 3 so as to permit the free passage of a cartridge therefrom onto the forward end of the carrier 79 which is then in its cartridge-receiving position. When, however, the slide 108 starts on its forward movement with the barrel, the bevel of the bottom wall of the notch 107 acts upon the upper end of the finger 116 to spring the stop 114 inward so as to bring its finger 116 into the path of the cartridges in time to engage with the head of the rearmost cartridge which it will hold back until the barrel has returned to its closed position when the stop is again permitted by the notch 117 to spring outwardly and release the detained cartridge and allow the same to be fed back upon the carrier.

For closing the barrel at the breech, I employ an obturator 118 (Fig. 14) consisting of a short thick disk located in a recess 119 in the upper portion of the front face of the breech-wall 125 of the gun-frame 31. A transverse pin 120 passing through the side walls of the gun-frame and through the obturator secures the same in place. Two extractors 54 (Fig. 13) are mounted in this obturator the sides of which are respectively formed with grooves 121, 121, for their reception. On account of its construction and arrangement the obturator 118 is very readily removed and replaced as occasion may require. Being constantly exposed to the corrosive action of the gases it is likely to require frequent cleaning and renewal.

At their rear ends the extractors are engaged by plungers 122 encircled by springs 123, the said plungers and springs being located in holes 124 drilled in the breech-wall 125 at a point back of the recess 119 therein. The obturator has a central hole 126 for the reception of the forward end of the firing-pin 127 which is encircled by a spring 128 for retracting it when the hammer is cocked. The firing pin 127 and the spring 128 are located in a passage 129 formed for their reception in the breech-wall 125 aforesaid. A vertical passage 130 leads from the hole 126 in the obturator to permit the escape of any gas from pierced primers.

The magazine 3 is charged when the gun is closed through a loading-opening 131 in the gun-frame, by pushing the forward end of the carrier 79 upward by the entering cartridge $a$ (Fig. 17) and starting the same forward into the magazine. The cartridge should not, however, be pushed all the way into the magazine but should be released when in an approximately horizontal position, to the action of the magazine-follower 20 which will push it against a shoulder 132 at the rear end of a groove 133 in the lower face of the carrier as shown in Fig. 17. This cartridge will then be engaged and pushed forward into the magazine by the following cartridge $b$ (Fig. 17) and so on, until the magazine is full. The last cartridge to enter the magazine should be pushed forward far enough to clear the forward end of the carrier and permit the same to be moved down into its cartridge-receiving position by means of the leaf 82 of the spring 81. The rearmost cartridge will then be fed back onto the upper face of the carrier ready to be lifted thereby into position to have the barrel telescoped over it. After the magazine is full the gun is manually operated by means of the handle 39 to prepare the gun for use.

It is apparent that in carrying out my invention some changes from the construction herein shown and described may be made. I would therefore have it understood that I do not limit myself thereto but hold myself at liberty to make such departures therefrom as fairly fall within the spirit and scope of my invention.

Having fully described my invention, what I claim as new and desire to secure by Letters Patent is:—

1. In a gas operated gun, the combination with a movable barrel, of a stationary tubular magazine, means for utilizing a portion of the gases of explosion for moving the barrel forward by pressure exerted against the front of the magazine, and action mechanism connected with the movable barrel for operation thereby whereby the spent shells are ejected, the loaded cartridges are fed and the hammer is cocked.

2. In a gas-operated gun, the combination with a movable barrel having a gas-port, of a stationary tubular magazine, a magazine-tip formed at its forward end with a gas-chamber, a bracket depending from the barrel, and a piston carried by the bracket and entering the said gas-chamber, the said bracket and piston having passages leading from the said gas-port into the bottom of the gas-chamber.

3. In a gas-operated gun, the combination with a movable barrel having a gas-port, a stationary tubular magazine, of a bracket depending from the said barrel and having a gas-passage, a piston formed independent of and applied to the said bracket and having a gas-passage, a magazine-tip mounted upon the forward end of the magazine and having a gas-chamber receiving the said piston, whereby a portion of the gases of explosion are conveyed from the barrel to the said chamber in which they expand for moving the barrel forward.

4. In a gas-operated gun, the combination with a movable barrel, of a stationary tubular magazine, means interposed between the barrel and the magazine for utilizing a portion of the gases of explosion for moving the barrel forward, a bearing sleeve depending from the barrel and encircling the forward end of the magazine upon which it rides back and forth, and a guard or jacket inclosing the forward end of the barrel and the said bearing-sleeve.

5. In a gas-operated gun, the combination with a movable barrel, of a stationary tubular magazine, a magazine-tip having a gas-chamber, a piston carried by the barrel and entering the said gas-chamber, provision being made for leading a portion of the gases of explosion from the barrel into the said gas-chamber, a bearing-sleeve carried by the barrel and riding back and forth over the forward end of the magazine, a barrel operating-spring encircling the rear portion of the magazine, an operating-spring abutment mounted upon the magazine, and a jacket respectively supported at its rear and forward ends by the sleeve and tip and inclosing the forward end of the barrel and the said bearing-sleeve.

6. In a gas-operated gun, the combination with a movable barrel, of a stationary tubular magazine, means for utilizing a portion of the gases of explosion for moving the barrel forward by pressure exerted against the front end of the magazine, a barrel-operating spring encircling the rear end of the magazine, a sleeve mounted upon the magazine and forming an abutment for the front end of the said spring, a forearm inclosing the said spring, and a forearm tip mounted in the forearm and supported in the said sleeve.

7. In a gas-operated gun, the combination with a movable barrel, of a stationary tubular magazine, means for utilizing a portion of the gases of explosion for moving the barrel forward by pressure exerted against the front of the magazine, a bearing-sleeve carried by the barrel and sliding back and forth over the front end of the magazine, a barrel-operating spring encircling the rear portion of the magazine, an operating-spring abutment sleeve mounted upon the magazine, a jacket inclosing the front end of the magazine and the said bearing-sleeve and supported at its rear end by the said operating-spring abutment sleeve, and a forearm supported at its forward end by the said abutment sleeve.

8. In a gas-operated gun, the combination with a movable barrel, of a stationary tubular magazine, means for utilizing a portion of the gases of explosion for moving the barrel forward by pressure exerted against the front of the magazine, a barrel operating spring for moving the barrel rearward, mechanism for ejecting the spent shells and feeding the loaded shells, and connections between the said mechanism and the rear end of the movable barrel.

9. In a gas-operated gun, the combination with a movable barrel, of a stationary tubular magazine, a coupling sleeve mounted upon the barrel and encircling the magazine, an operating spring encircling the magazine in position to be compressed by the forward movement of the said sleeve, an action-slide connection secured at its forward end to the said sleeve, and a pivotal ejector operated by the rear end of the said connection.

10. In a gas-operated gun, the combination with a movable barrel, of a stationary tubular magazine, means for utilizing a portion of the gases of explosion for moving the barrel forward by pressure exerted against the front of the magazine, a coupling sleeve mounted upon the barrel and encircling the magazine, an action-slide, an action-slide connection secured at its forward end to the said sleeve and provided at its rear end with a handle for the manual operation of the gun.

11. In a gas-operated gun, the combination with a movable barrel, of a stationary tubular magazine, means for utilizing a portion of the gases of explosion for moving the barrel forward by pressure exerted against the front of the magazine, a coupling sleeve mounted upon the barrel and encircling the magazine, an action-slide connection secured at its forward end to the said sleeve, an action-slide, an action-slide hook pivoted to the forward end thereof and engaged by the said action slide connection whereby the action slide is moved back and forth.

12. In a gas-operated gun, the combination with a movable barrel, of a stationary tubular magazine, means for utilizing a portion of the gases of explosion for moving the barrel forward by pressure exerted against the front of the magazine, a coupling sleeve mounted upon the barrel and encircling the magazine, an action-slide connection secured at its forward end to the said sleeve, an action-slide having a beveled lug, and an action-slide hook carried by the action-slide and engaged by the action-slide connection, a hammer, trigger and sear, a cocking lever co-acting with the hammer and with the said beveled lug, whereby the hammer is cocked during the forward movement of the barrel.

13. In a gas-operated gun, the combination with a movable barrel, of a stationary tubular magazine, means for utilizing a portion of the gases of explosion for moving the barrel forward by pressure exerted against the front of the magazine, an action-slide connection secured at its forward end to the barrel by which it is moved back and forth, an action-slide, an action-slide hook carried thereby and engaged by the said connection, a lug at the rear end of the action-slide, a carrier-lever operated by the said lug, and a pivotal carrier operated by the said lever.

14. In a gas-operated gun, the combination with a movable barrel, of a stationary tubular magazine, means for utilizing a portion of the gases of explosion for moving the barrel forward by pressure exerted against the front of the magazine, an action-slide connection connected at its forward end to the said barrel by means of which it is moved back and forth, an action-slide formed upon its inner face with a lug having its forward and rear ends beveled, an action-hook carried by the forward end of the slide and engaged by the said connection for the movement of the action-slide back and forth, a pivotal carrier-lever operated by the said lug, a pivotal carrier operated by the said lever, and springs acting downward upon the carrier-lever and upward on the carrier.

15. In a gas-operated gun, the combination with a longitudinally movable barrel, of a spring for normally holding the barrel at the limit of its rearward movement, means for utilizing a portion of the gases of explosion for moving the barrel forward, a hammer, a sear, a trigger at all times free to be swung on its pivot to the limit of its swinging movement, and a timing-mechanism controlled by the barrel in the forward movement thereof and coacting with the sear and trigger to limit the effective operation of the trigger upon the sear to the closed position of the barrel, whereby the gun cannot be fired until the rearward pull upon the trigger has been removed.

16. In a gas-operated gun, the combination with a longitudinally movable barrel, of a spring for normally holding the barrel at the limit of its rearward movement, means for utilizing a portion of the gases of explosion for moving the barrel forward, an action-slide partaking of the movement of the barrel forward and back, a hammer, sear and trigger, and a timing-mechanism operated by the said action-slide in the forward movement thereof with the barrel and coacting with the sear and trigger for limiting the effective operation of the trigger upon the sear to the closed position of the barrel.

17. In a gas-operated gun, the combination with a longitudinally movable barrel, of a spring for normally holding the barrel at the limit of its rearward movement, means for utilizing a portion of the gases of explosion for moving the barrel forward, an action-slide partaking of the movement of the barrel forward and back, a hammer, sear and trigger, a timing-lever operated by the said action-slide in the forward movement thereof, a timing-rocker actuated by the said lever, and a timing-yoke carried by the said rocker and coating with the trigger and sear for the effective operation of the trigger upon the sear when the barrel is in its closed position.

18. In a gas-operated gun, the combination with the gun-frame, of a longitudinally movable barrel, a spring for normally holding the barrel at the limit of its rearward movement, means for utilizing a portion of the gases of explosion for moving the barrel forward, a stationary tubular magazine, a cartridge-stop located within the gun-frame in position to stop the feeding of the cartridges from the magazine and controlled by the forward movement of the barrel to stop the feeding of the cartridges from the magazine.

19. In a gas-operated gun, the combination with the gun-frame, of a longitudinally movable barrel, a spring for normally holding the barrel at the limit of its rearward movement, means for utilizing a portion of the gases of explosion for moving the barrel forward, a stationary tubular magazine, a cartridge-stop located within the gun-frame in position to stop the feeding of the cartridges from the magazine, and an action-slide partaking of the movement of the barrel forward and back and coacting directly with the stop during its forward movement with the barrel for stopping the feeding of cartridges from the magazine.

20. In a gas-operated gun, the combination with a gun-frame having a top-ejection opening, of a longitudinally movable barrel, a spring for normally holding the barrel at the limit of its rearward movement, means for utilizing a portion of the gases of explosion for moving the barrel forward, an obturator, two extractors located in recesses therein in a horizontal plane, and an ejector pivotally mounted in the rear portion of the gun-frame and controlled in being swung forward and upward by the forward movement of the barrel, for forcing the spent shells out of the grasp of the said extractors and ejecting them through the said top-ejection opening.

21. In a gas-operated gun, the combination with a gun-frame having a top-ejection opening, of a longitudinally movable barrel, a spring for normally holding the barrel at the limit of its rearward movement, means for utilizing a portion of the gases of explosion for moving the barrel forward, an obturator, two extractors located in recesses therein in a horizontal plane, an action-slide, an ejector pivotally mounted in the gun-frame and operated directly by the said slide during the forward movement thereof with the barrel, whereby the ejector is swung forward and upward for forcing the spent shells out of the grasp of the extractors and ejecting them through the said top ejector-opening; and means for intermittently connecting the said slide with the gun-barrel for its operation thereby.

22. In a gas-operated gun, the combination with the gun-frame, of a longitudinally movable barrel, a spring for normally holding the barrel at the limit of its rearward movement, means for utilizing a portion of the gases of explosion for moving the barrel forward, an ejector hung on the gun-frame, a cartridge-carrier hung on the gun-frame, an action-slide, and means for connecting the slide with the barrel which picks up the slide for the operation of the ejector during the forward movement of the barrel and for the operation of the carrier during the rearward movement of the barrel which then drops the slide.

23. In a gas-operated gun, the combination with a gun-frame having a top-ejection opening, of a longitudinally movable barrel, a spring for normally holding the barrel at the limit of its rearward movement, means for utilizing a portion of the gases of explosion for moving the barrel forward, action-mechanism controlled in its operation by the barrel in the forward and rearward movement thereof, an obturator located in a recess in the gun-frame, two extractors respectively located in recesses in opposite faces of the obturator, and an ejector pivotally mounted in the rear portion of the gun-frame and swung forward and upward by the said action-mechanism during the forward movement of the said barrel.

24. In a gas-operated gun, the combination with a gun-frame having a recess in its breech-wall and a top-ejection opening, of a longitudinally movable barrel, a spring for normally holding the barrel at the limit of its rearward movement, means for utilizing a portion of the gases of explosion for moving the barrel forward, action mechanism controlled in its operation by the barrel in the forward and rear movement thereof, an obturator located in the said recess in the breech-wall of the gun-frame, two extractors respectively located in recesses in opposite faces of the said obturator, and an ejector pivotally mounted in the rear portion of the gun-frame and operated by the said mechanism in being swung upward and forward during the forward movement of the barrel, the said obturator forming a stop for the said ejector.

In testimony whereof, I have signed this specification in the presence of two subscribing witnesses.

WILLIAM MASON.

Witnesses:
  GEORGE D. SEYMOUR,
  FREDERIC C. EARLE.